US009347520B2

(12) United States Patent
Wolf

(10) Patent No.: US 9,347,520 B2
(45) Date of Patent: May 24, 2016

(54) FLAT BELT CLAMPING SYSTEM AND METHOD

(75) Inventor: Peter Wolf, Seeheim (DE)

(73) Assignee: GATES CORPORATION, Denver, CO (US)

( * ) Notice: Subject to any disclaimer, the term of this patent is extended or adjusted under 35 U.S.C. 154(b) by 567 days.

(21) Appl. No.: 13/309,228

(22) Filed: Dec. 1, 2011

(65) Prior Publication Data

US 2013/0143705 A1 Jun. 6, 2013

(51) Int. Cl.
*F16G 3/08* (2006.01)
*F16G 3/07* (2006.01)
*F16G 1/08* (2006.01)
*F16G 1/28* (2006.01)
*F16G 3/10* (2006.01)

(52) U.S. Cl.
CPC .. *F16G 3/07* (2013.01); *F16G 1/08* (2013.01); *F16G 1/28* (2013.01); *F16G 3/08* (2013.01); *F16G 3/10* (2013.01); *Y10T 24/16* (2015.01)

(58) Field of Classification Search
CPC ............ B65G 15/60; F16G 3/07; F16G 3/10; F16G 3/08; F16G 3/06; B32B 37/14; Y10T 24/1628; Y10T 24/1684; Y10T 24/16
USPC ....................................... 198/844.2; 474/257
See application file for complete search history.

(56) References Cited

U.S. PATENT DOCUMENTS

| 3,848,571 | A | | 11/1974 | Pearson et al. |
| 3,999,914 | A | | 12/1976 | Breher et al. |
| 4,177,687 | A | * | 12/1979 | Russ, Sr. ....................... 474/242 |
| 4,185,791 | A | | 1/1980 | Takada |
| 4,395,298 | A | | 7/1983 | Wetzel et al. |
| 4,541,823 | A | | 9/1985 | Marsh et al. |
| 4,642,080 | A | * | 2/1987 | Takano ..................... F16G 1/22 305/180 |
| 4,950,212 | A | * | 8/1990 | Masuda et al. ................ 474/242 |
| 5,114,001 | A | * | 5/1992 | Anderson ................ F16G 3/06 198/844.2 |
| 5,320,214 | A | * | 6/1994 | Kordis ................... B65G 15/64 198/750.1 |
| 5,419,744 | A | * | 5/1995 | Kagebeck ................ F16G 3/00 474/253 |

(Continued)

FOREIGN PATENT DOCUMENTS

DE 3527640 A1 2/1987
JP 2003182827 A 7/2003

OTHER PUBLICATIONS

European Patent Office, European Search Report for EP application No. 12194690, date of completion of the search Sep. 25, 2013, The Hague.

(Continued)

*Primary Examiner* — Thomas Randazzo
(74) *Attorney, Agent, or Firm* — Paul N. Dunlap, Esq.; Jeffrey A. Thurnau, Esq.

(57) ABSTRACT

A belt clamping system including an open-ended, flat belt with an end portion having a number of teeth projecting therefrom and a clamping plate with matching tooth profile for use in connecting the belt end to another structure. The flat belt may be reinforced with longitudinally extending cords. The toothed profile may be a standard timing belt profile and may be unreinforced. A length of timing belt profile material may be welded to the flat surface of the open-ended flat belt at or near an end. The length of timing belt profile may include at least 7 tooth pitches. The end portion may be clamped between a flat surface of a flat plate and a grooved surface of a grooved plate having grooves complementary to the timing belt teeth.

13 Claims, 3 Drawing Sheets

(56) References Cited

U.S. PATENT DOCUMENTS

| | | | | |
|---|---|---|---|---|
| 5,878,467 | A * | 3/1999 | Yokota | A44B 19/262 24/265 EE |
| 6,129,350 | A * | 10/2000 | St. Ours | B41F 13/03 198/644 |
| 6,223,611 | B1 * | 5/2001 | Kelley | B65G 35/00 198/750.1 |
| 6,264,000 | B1 * | 7/2001 | Johnson | A01M 31/02 182/136 |
| 6,296,588 | B1 * | 10/2001 | Ciemniecki | B29D 29/08 474/268 |
| 6,419,072 | B2 * | 7/2002 | Kelley | B65G 35/00 198/346.1 |
| 6,820,309 | B1 * | 11/2004 | Gersbach | F16G 3/08 198/844.2 |
| 6,854,164 | B2 | 2/2005 | Bass et al. | |
| 6,942,828 | B2 | 9/2005 | Kolling | |
| 6,966,763 | B2 | 11/2005 | Göser et al. | |
| 6,994,487 | B2 | 2/2006 | Traktovenko et al. | |
| 8,052,820 | B2 | 11/2011 | O'Donnell et al. | |
| 8,192,316 | B2 * | 6/2012 | Marc | B65G 15/34 442/229 |
| 8,454,464 | B2 * | 6/2013 | Pasch | B29D 29/08 156/137 |
| 8,910,462 | B2 * | 12/2014 | De Smet | B29C 66/1142 57/202 |
| 2001/0051555 | A1 | 12/2001 | Isshiki et al. | |
| 2003/0146072 | A1 * | 8/2003 | Rubino | F16G 3/04 198/844.2 |
| 2005/0113200 | A1 * | 5/2005 | Okuno | F16G 5/166 474/266 |
| 2006/0154766 | A1 * | 7/2006 | Lacy et al. | 474/148 |
| 2009/0008025 | A1 * | 1/2009 | Mol | B65G 15/42 156/137 |
| 2009/0084636 | A1 | 4/2009 | Attinger et al. | |
| 2010/0133046 | A1 | 6/2010 | Allwardt et al. | |
| 2010/0281659 | A1 | 11/2010 | Ciobotaru et al. | |
| 2011/0129647 | A1 * | 6/2011 | Duke et al. | 428/156 |
| 2012/0309573 | A1 * | 12/2012 | Well et al. | 474/205 |
| 2013/0040771 | A1 * | 2/2013 | Well | F16G 1/28 474/205 |
| 2013/0130854 | A1 * | 5/2013 | Tay | 474/83 |

OTHER PUBLICATIONS

Gates Mectrol Inc., "Urethane Timing Belts and Pulleys," catalog pp. 24-27 & 64 (Dec. 2006).

* cited by examiner

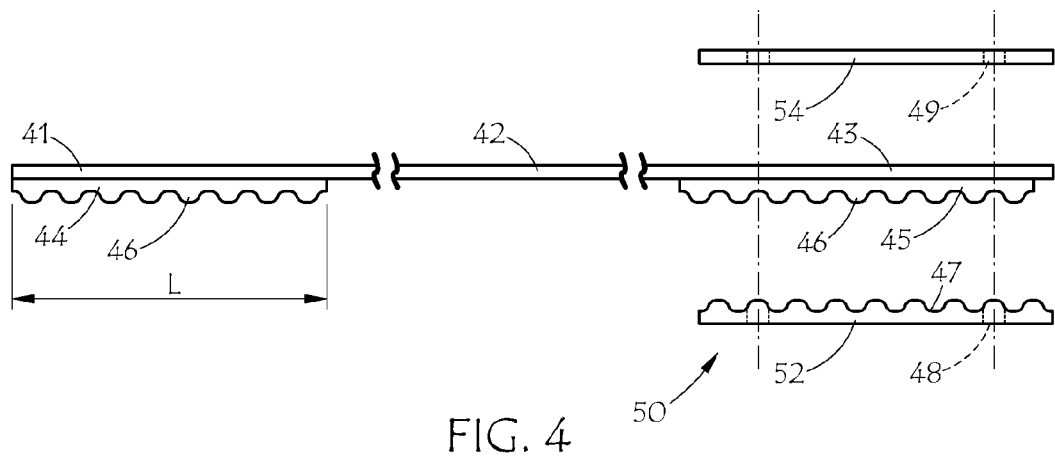
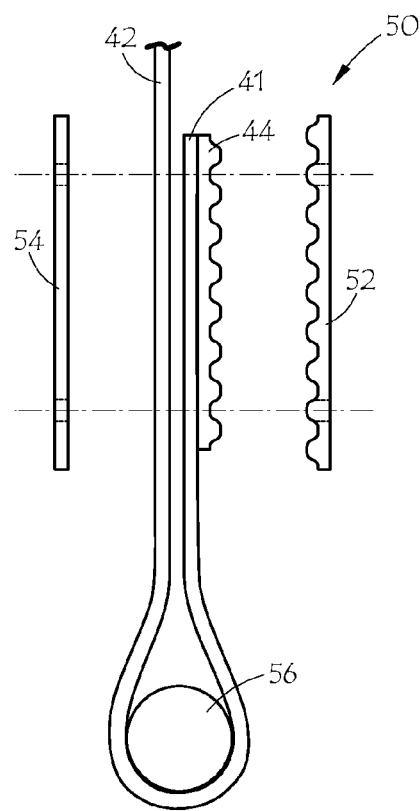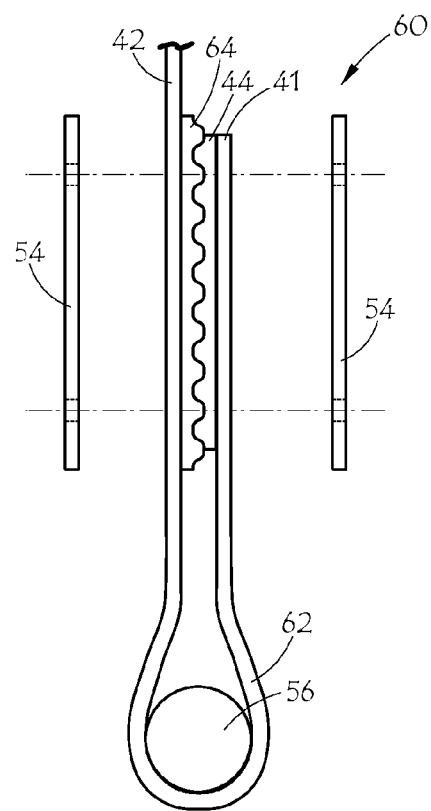
FIG. 5   FIG. 6

FLAT BELT CLAMPING SYSTEM AND METHOD

BACKGROUND OF THE INVENTION

1. Field of the Invention

This invention relates generally to open-ended belting for power transmission, transport, and positioning applications, more particularly to open-ended, flat belting with modified ends for improved clamping, and specifically to flat belting with an end portion with a number of teeth projecting therefrom.

2. Description of the Prior Art

Flat belts having an elastomeric body with reinforcing cords of aramid or steel provide high-strength, low-stretch, flexible belting for applications such as conveying, lifting, or positioning. These flat belts are typically sold in open ended lengths and may be clamped at each end. Clamping directly onto the end of a flat belt is not very reliable so various forms of wrapped clamping arrangements have been used or proposed in order to increase the frictional engagement. Two such conventional clamping arrangements are illustrated in FIGS. 1 and 2.

FIG. 1 shows flat belt 10 wrapped around pin 12 which provides the point of attachment to whatever structure the belt is to be attached to (e.g., a clevis pin in a clevis device). The belt's end 11 is wrapped back onto the standing part and both sandwiched between two flat plates 13 and 14 with fasteners such as bolts through bolt holes 15. FIG. 2 shows belt end 11 of flat belt 10 sandwiched between two semi-cylindrical members 23 and 24. The belt is then wrapped around the cylinder a couple times to add holding strength. In both conventional cases, the clamping may not be sufficiently stable for highly dynamic or highly loaded applications. The connection between clamp and belt may work loose.

It is known to modify a clamp surface to improve frictional engagement of the clamp with the flat belt, such as adding teeth that bite into the belt, but these same methods may damage the belt.

SUMMARY

The present invention is directed to systems and methods which provide open-ended belting for power transmission, transport, positioning, and motion control, with modified ends for improved clamping. The invention is directed to an open-ended, flat belt with an end portion having a number of teeth projecting therefrom and a clamping plate with matching tooth profile for use in connecting the belt end to another structure. The flat belt may be reinforced with longitudinally extending cords. The toothed profile may be a standard timing belt profile and may be unreinforced.

The invention is also directed to a method involving welding a length of timing belt profile material to the flat surface of an open-ended flat belt at or near the end portion of the flat belt. The length of timing belt profile may include at least 7 or 8 tooth pitches, or more. Then the end portion is clamped between a flat surface of a flat plate and a grooved surface of a grooved plate having grooves complementary to the timing belt teeth. The grooved plate may have seven or more grooves. The length of timing belt may be unreinforced.

The invention is also directed to a system for belt clamping comprising the belt described above and a clamping plate having a surface with grooves complementary to the teeth welded on the end of the belt. Preferably the number of teeth engaged by the clamping plate is at least seven.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 4 is a side view of a flat belt clamping system according to an embodiment of the invention;

FIG. 5 is a side view of a flat belt clamping system according to another embodiment of the invention; and FIG. 6 is a side view of a flat belt clamping system according to another embodiment of the invention;

DETAILED DESCRIPTION

Figure 1:
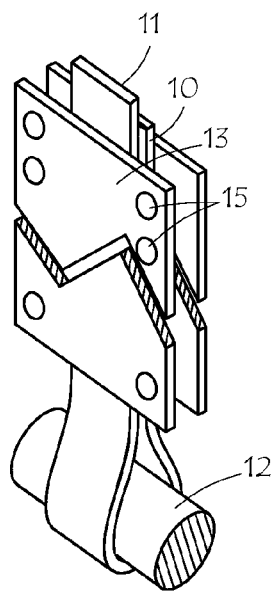
FIG. 1 is a flat belt clamping system of the prior art.
Figure 2:
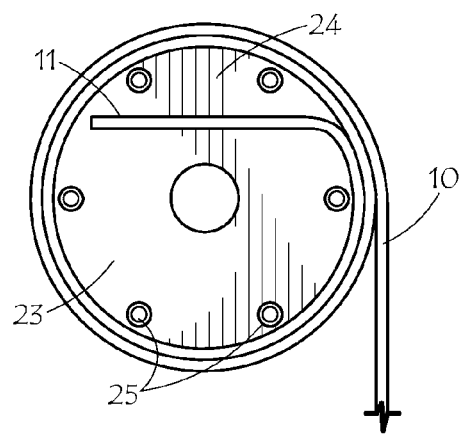
FIG. 2 is another flat belt clamping system of the prior art.
Figure 3:
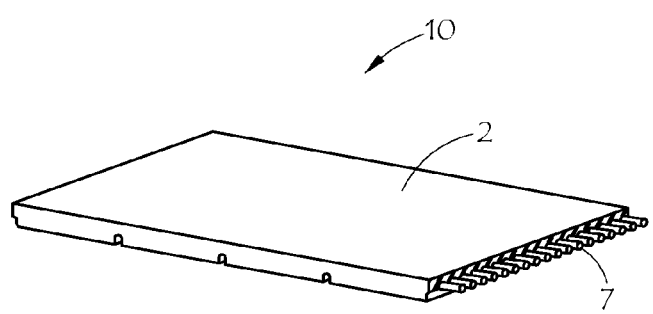
FIG. 3 is a partially fragmented perspective view of a conventional flat belt.

According to the embodiment of the invention shown in FIG. 4, flat belt clamping system 40 includes conventional flat belt 42 which is open-ended, having two ends, 41 and 43. Onto end 41 is welded timing belt section 44, having length "L", which is a section of timing belt profile material having eight teeth 46 projecting therefrom. The number of teeth 46 and/or the length of the section "L" is not critical but can be selected according to the particular needs of the clamping application. The other end 43 of flat belt 42 is shown with timing belt section 45 welded thereon, section 45 having for example nine teeth 46. The clamping system includes clamping plate system 50, which includes two clamping plates. Clamping plate 54 is a plain flat plate and clamping plate 52 has mating grooves 47 for meshing securely with teeth 46 of the belt. The two plates may be held together by fasteners (not shown) which may utilize holes 49, thus clamping the belt end there between for secure holding of the belt.

Any type of fastening system for tightening the two plates together onto the belt end may be used, such as nuts and bolts, screws, clips, wedging systems, and the like. Likewise the clamping system may be fastened to any type of structure or system by any suitable means of attachment, or even be an integral part of a larger structure or system. U.S. Pat. No. 6,994,487 to Traktovenko et al. and U.S. Pat. Appl. Pub. No. 2010/0281659 A1 to Ciobotaru et al. show a couple examples of fastening systems for flat belting with a combination of wedging and clamping, which could be improved by the present invention by adding teeth to the end of the belt and complementary grooves to the clamping plate, and/or by including teeth on the belt portion around the wedge and complementary grooves on the wedge, for example.

FIGS. 5-8 illustrate other possible clamping system arrangements according to the invention. FIG. 5 shows the end of belt 42 looped around pin 56. Belt end 41 has timing toothed belt section 44 welded thereon. End 41 is clamped against the standing part of belt 42 with the clamping system 50, having flat plate 54 and grooved plate 52. Pin 56 provides the means to attach the belt to other structure. For example, pin 56 could be a clevis pin in a clevis-style device. Alternately, pin 56 could be a tear-drop-shaped or wedge-shaped pin in an angled housing, or a cross bar in a buckle device, or the like.

According to an embodiment of the invention, FIG. 6 shows the flat belt 42 with toothed section 44 welded onto end 41, and second toothed section 64 welded onto the standing part of belt 41 with some space between the two toothed sections to accommodate loop 62 around pin 56 with no teeth on loop 62. The two toothed sections are facing each other so the teeth mutually intermesh with each other. The clamping plate system 60 therefore need only comprise two plain or flat plates 54 to secure the belt end.

Figure 7:
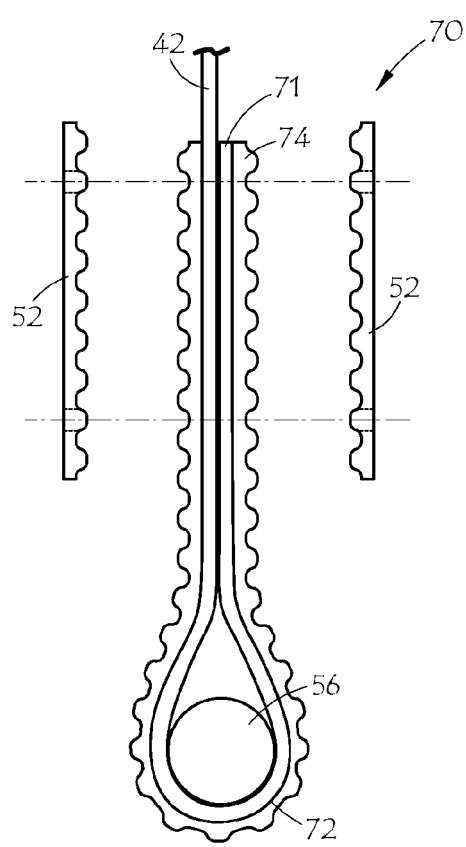
FIG. 7 is a side view of a flat belt clamping system according to another embodiment of the invention.

According to another embodiment of the invention, FIG. 7 shows the flat belt 42 with a somewhat longer toothed section 74 welded onto end 71 than in the previous embodiments. The toothed section may be looped around pin 56, which is positioned approximately at the middle of the toothed section. Welded, toothed end 74 is therefore long enough to wrap around pin 56 and loop back on itself so that toothed sections are facing away from each other, with flat belt surfaces back-to-back. The belt teeth then may intermesh with two grooved clamping plates 52, making up clamping plate system 70. The clamping plates 52 may thus secure the two opposing sets of teeth for more holding power. The loop 72 around pin 56 may therefore have some unused teeth.

Figure 8:
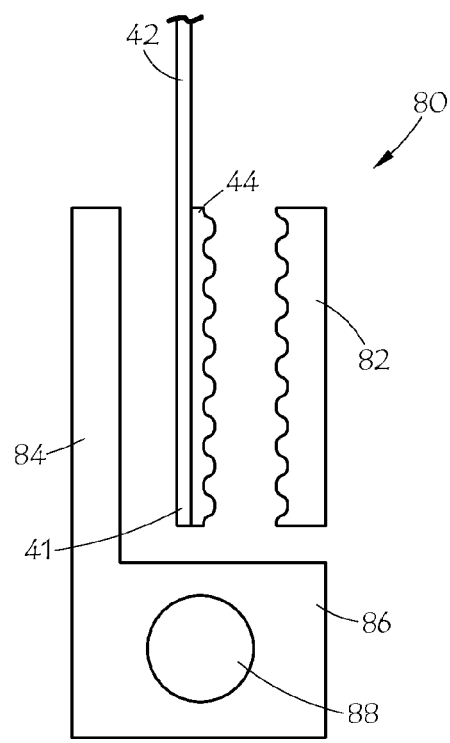
FIG. 8 is a side view of a flat belt clamping system according to yet another embodiment of the invention.

According to yet another embodiment of the invention as shown in FIG. 8, flat belt clamping system includes conventional flat belt 42 which is open-ended, having timing belt section 44 welded onto belt end 41. The number of teeth can again be selected according to the particular needs of the clamping application. The clamping system includes clamping plate system 80, which includes two clamping plates. Clamping plate 84 is a plain flat plate and clamping plate 82 has mating grooves for meshing securely with the teeth at the belt end. The two plates may be held together by fasteners as described above in connection with other embodiments (not shown), thus clamping the belt end there between for secure holding of the belt. The distal end of the flat clamping plate 84 includes mounting feature 86, which by way of example has hole 88 for fastening or mounting to other structures. It should be understood that FIG. 8 is exemplary and that other forms of mounting features, fastening means, hole locations or orientations are within the scope of the invention. Likewise, the mounting feature could be located on either plate.

In each of the FIGS. 4-7, it should be understood that the number of teeth 46 and/or the length of the section "L" is not critical but can be selected according to the particular needs of the clamping application. It may be advantageous, as a general rule of thumb, to have at least 7 or at least 8 belt teeth in mesh with a grooved clamping plate, and second toothed section 64 welded onto the standing part of belt 41 with some space between the two toothed sections to accommodate loop 62 around pin 56 with no teeth on loop 62. The clamping plate system 60 therefore need only comprise two plain or flat plates 54 to secure the belt end.

Any type of open-ended flat belting may be used as long as a suitable toothed belt section can be welded or firmly attached to an end thereof. In a preferred embodiment the flat belting may be thermoplastic elastomer ("TPE") with longitudinally extending tensile members embedded therein. The TPE may be thermoplastic polyurethane ("TPU") or any other suitable thermoplastic polymer. The tensile member may be steel, aramid, carbon fiber, or the like. Various methods of making reinforced, open-ended belting are known and may be used without limitation. Examples of suitable methods include U.S. Pat. No. 6,966,763 to Göser et al., U.S. Pat. No. 8,052,820 to O'Donnell et al., and the like.

The toothed belt section for the clamping region or regions at the end or ends of the flat belt may be reinforced timing belt profile material of the same thermoplastic composition as the flat belt, or unreinforced. The toothed belt section may then be welded to the belt end using known methods, such as thermal fusing methods, ultrasound, heated platens and pressure, adhesive, or the like. The tooth shape may be one of the known standard timing or synchronous belt standard shapes, such as a trapezoidal or curvilinear shape. The tooth shape may be some other shape such as triangular or rectangular or round. Complementary grooves are grooves into which the chosen tooth shape fits comfortably, or snugly, or even tightly. The result is a positive locking or engaging between clamp plate and belt which resists any slippage without relying solely on friction and without damaging or significantly deforming the belt.

The toothed profile material for the toothed belt section may be made of continuously extruded TPE or TPU having teeth, or other desired belt profile, on one side and a flat surface on the opposite side, and then cut to the desired length "L" for welding onto the flat belt end. The profile may be formed by any of various known methods of extrusion forming or molding, such as the methods disclosed in U.S. Pat. No. 3,999,914 to Breher et al., U.S. Pat. No. 6,942,828 to Kolling, and the like, which utilize a molding wheel and molding band adjacent about half of the circumference of the molding wheel to form a rotating profile molding chamber into which the profile material is extruded for continuous shaping. It should be understood that such forming processes may be implemented without any embedded cord for the purposes of the present invention, if it is desired to maintain flexibility at the end of the belt.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A belt clamping system comprising:
   an open-ended flat belt comprising an elastomeric body with longitudinally extending tensile members embedded therein and having a modified end for improved clamping, wherein the modified end comprises an end portion with a first plurality of teeth comprising a first portion of a timing belt welded on one side of said end portion;
   a second plurality of teeth comprising a second portion of a timing belt welded onto the standing part of the flat belt with sufficient space between the two pluralities of teeth to accommodate forming a loop having no teeth; and
   two flat clamping plates having no grooves complementary to said teeth;
   wherein each said plurality of teeth comprises at least seven teeth:
   wherein said modified end is wrapped around a pin back onto the standing part of the flat belt forming a loop around the pin; and said end portion and the adjacent portion of the standing part of the flat belt are clamped between said two clamping plates; wherein at least one of said first and second portion of a timing belt is unreinforced; and wherein the teeth of the end portion and the teeth of the adjacent portion intermesh with each other between the two clamps.

2. A belt clamping system comprising:
   an open-ended flat belt comprising an elastomeric body with longitudinally extending tensile members embedded therein and having a modified end for improved clamping, wherein the modified end comprises an end portion with a plurality of teeth comprising a first portion of a timing belt welded on one side of said end portion; and
   a first clamping plate having a surface with grooves complementary to said teeth;
   wherein said plurality of teeth comprises at least seven teeth and said clamping plate has at least seven said grooves; and
   wherein a second plurality of teeth comprising a second portion of a timing belt is welded onto a standing part portion of the flat belt with sufficient space between the two pluralities of teeth to accommodate forming a loop having no teeth around a pin.

3. The system of claim 2 further comprising a second grooved plate; wherein the teeth on said end portion mesh with the grooves of one said plate and the teeth on said standing part portion mesh with the grooves of the other said plate.

4. A belt clamping system comprising:
   an open-ended flat belt comprising an elastomeric body with longitudinally extending tensile members embedded therein and having a modified end for improved clamping, wherein the modified end comprises an end portion with a plurality of teeth comprising a first portion of a timing belt welded on one side of said end portion;
   a first clamping plate having a surface with grooves complementary to said teeth; and
   a second clamping plate having a flat surface and no grooved surface complementary to said teeth; said plates adapted to clamp said belt end portion there between;
   wherein said modified end is wrapped back onto the standing part of the flat belt forming a loop; and said end portion and the adjacent portion of the standing part of the flat belt are clamped between said plates;
   further comprising a pin in said loop;
   wherein said plurality of teeth comprises at least seven teeth and said first clamping plate has at least seven said grooves; and
   wherein said portion of a timing belt is unreinforced.

5. The system of claim 4 wherein the teeth on said modified end mesh with the grooves on said first plate.

6. A belt clamping system comprising:
   an open-ended flat belt comprising an elastomeric body with longitudinally extending tensile members embedded therein and having a modified end for improved clamping, wherein the modified end comprises an end portion with at least fourteen teeth comprising a portion of an unreinforced timing belt welded on one side of said end portion;
   two clamping plates, each having a surface with at least seven grooves complementary to said teeth, and each adapted to clamp said belt end portion there between, and each intermeshed with at least seven of said teeth;
   wherein the end portion is long enough to wrap, and is wrapped, around a pin and back on itself forming a fully toothed loop around the pin and extending between the two plates.

7. A method comprising:
   providing an open-ended flat belt comprising an elastomeric body with longitudinally extending tensile members embedded therein;
   providing a first length of timing belt comprising at least seven teeth;
   welding said first length of timing belt onto a portion of one flat surface of said flat belt at or near an end of said flat belt, to produce a flat belt having a modified end for improved clamping;
   wrapping said modified end around a pin and back onto the standing part of the flat belt forming a loop around the pin; and
   clamping said end portion and the adjacent portion of the standing part of the flat belt between two plates.

8. The method of claim 7 wherein said two plates comprise a flat plate and a grooved plate with at least seven grooves; and further comprising clamping said end portion and said adjacent portion of the standing part between a flat surface of said flat plate and a grooved surface of said grooved plate with said grooves complementary to and meshing with said timing belt teeth.

9. The method of claim 7 wherein said length of timing belt is unreinforced.

10. The method of claim 7 further comprising welding a second length of timing belt comprising at least seven teeth onto said adjacent portion of the standing part of the flat belt with sufficient space between the two lengths of timing belt to accommodate forming said loop in the flat belt with no teeth; and wherein said clamping includes said two lengths of timing belt between said two plates.

11. The method of claim 10 wherein said two plates are both flat plates without grooves complementary to said teeth and said wrapping results in said two lengths of timing belt meshing with each other.

12. The method of claim 7 wherein said end portion is long enough to wrap back on itself in said wrapping step forming a fully toothed loop around the pin and with the teeth extending between the two plates.

13. The method of claim 12 wherein each of said two plates comprises at least seven grooves complementary to and intermeshed with at least seven of said teeth.

\* \* \* \* \*